(12) United States Patent
Kong (10) Patent No.: US 11,001,303 B2
(45) Date of Patent: May 11, 2021

(54) LIGHTWEIGHT COWL CROSSBAR FOR VEHICLE

(71) Applicants: Hyundai Motor Company, Seoul (KR); Kia Motors Corporation, Seoul (KR)

(72) Inventor: ByungSeok Kong, Gunpo-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/437,369

(22) Filed: Jun. 11, 2019

(65) Prior Publication Data

US 2020/0189661 A1    Jun. 18, 2020

(30) Foreign Application Priority Data

Dec. 13, 2018  (KR) .......................... 10-2018-0160638

(51) Int. Cl.
| | |
|---|---|
| *B62D 21/15* | (2006.01) |
| *B62D 25/08* | (2006.01) |
| *B62D 1/19* | (2006.01) |
| *B62D 29/04* | (2006.01) |
| *G02B 27/01* | (2006.01) |
| *B60K 35/00* | (2006.01) |

(52) U.S. Cl.
CPC ............ *B62D 21/152* (2013.01); *B60K 35/00* (2013.01); *B62D 1/19* (2013.01); *B62D 25/081* (2013.01); *B62D 29/04* (2013.01); *G02B 27/0149* (2013.01); *B60K 2370/1529* (2019.05); *B60K 2370/80* (2019.05); *G02B 2027/0169* (2013.01)

(58) Field of Classification Search
CPC ...... B62D 21/152; B62D 25/081; B62D 1/19; B62D 29/04; B62D 1/16; B62D 21/15; B62D 25/145; G02B 27/0149; G02B 2027/0169; B60K 35/00; B60K 2370/80; B60K 2370/1529
USPC ...................................................... 296/193.02
See application file for complete search history.

(56) References Cited

U.S. PATENT DOCUMENTS

| | | | |
|---|---|---|---|
| 6,949,282 B2* | 9/2005 | Obeshaw | B21C 37/15 138/119 |
| 7,128,360 B2* | 10/2006 | Scheib | B62D 25/142 296/70 |
| 7,920,102 B2* | 4/2011 | Breed | B60K 37/06 345/7 |
| 10,363,963 B2* | 7/2019 | Someya | B62D 27/065 |
| 2008/0048419 A1* | 2/2008 | Kong | B29C 45/1635 280/728.3 |

(Continued)

FOREIGN PATENT DOCUMENTS

KR  10-2006-0005787 A    1/2006

*Primary Examiner* — Pinel E Romain (74) *Attorney, Agent, or Firm* — Morgan, Lewis & Bockius LLP (57) ABSTRACT

A lightweight cowl crossbar may include a cowl cross beam of connecting transversely side frames disposed on both sides of a vehicle body; side fastening portions to be coupled to both end portions of the cowl cross beam; a support leg positioned at a center portion of the cowl cross beam and configured to be supported to a front vehicle body of a vehicle; and a reinforcing bracket of integrally connecting the support leg and the cowl cross beam wherein the components mentioned above are constructed integrally from a plastic material.

9 Claims, 7 Drawing Sheets

(56) References Cited

U.S. PATENT DOCUMENTS

| | | | |
|---|---|---|---|
| 2015/0183469 A1* | 7/2015 | Kong | B62D 25/145 |
| | | | 296/193.02 |
| 2016/0362002 A1* | 12/2016 | Aoki | B60R 1/00 |
| 2017/0088187 A1* | 3/2017 | Stojkovic | B62D 25/081 |
| 2017/0120955 A1* | 5/2017 | Kim | B62D 25/145 |
| 2017/0305476 A1* | 10/2017 | Kulkarni | B62D 29/041 |
| 2018/0290691 A1* | 10/2018 | Kapila | B62D 25/147 |
| 2019/0232578 A1* | 8/2019 | Kneveler | B62D 25/14 |

* cited by examiner

LIGHTWEIGHT COWL CROSSBAR FOR VEHICLE

CROSS-REFERENCE(S) TO RELATED APPLICATION

The present application claims priority to Korean Patent Application No. 10-2018-0160638 filed on Dec. 13, 2018, the entire contents of which is incorporated herein for all purposes by this reference.

BACKGROUND OF THE INVENTION

Field of the Invention

The present invention relates to a lightweight cowl crossbar assembly, and more particularly, to a lightweight cowl crossbar made of a plastic material and including a plurality of reinforcement members and joining structures for reducing weight and ensuring sufficient stiffness.

Description of Related Art

A vehicle body of a vehicle may include side frames disposed on both sides of the vehicle body and several cross beams connecting the side frames laterally.

A cowl cross beam, inter alia, is a structure disposed transversely in a vehicle compartment at the rear of a cowl panel to impart stiffness to the front of the vehicle body. The cowl cross beam is designed as a structure supporting a steering column and having sufficient stiffness to absorb engine vibration transmitted from the steering column.

A pair of support legs for supporting the cowl cross beam are coupled to the central lower side of the cowl cross beam. The support leg serves to disperse the vibration from the steering unit to the lower portion of the vehicle body. The support leg is provided with a connecting bar for increasing lateral stiffness of the support leg.

Both sides of the cowl cross beam are provided with side fastening portions for joining the cowl cross beam to the side frames, respectively.

Furthermore, the cowl cross beam is provided with various brackets for mounting an instrument panel, an air conditioning duct, a sound device, a fuse box, an airbag and the like.

The support legs, side fastening portions and various brackets, which are coupled to the cowl cross beam, are manufactured by pressing, extruding, casting, etc., respectively and then coupled to the cowl cross beam by welding.

The cowl crossbar is, however, required to change its structure in accordance with shape of a slim front cockpit of the vehicle as autonomous vehicles are supplied. Furthermore, in the case of the conventional internal combustion engine vehicle, there is a problem in that fuel efficiency of the vehicle is bad because a cowl crossbar is made of aluminum and thus weight of the vehicle is increased.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cowl crossbar which is made of a lightweight plastic material and can provide stable stiffness.

Furthermore, various aspects of the present invention are directed to providing a cowl crossbar injection-molded integrally from a material having physical properties of the plastic.

Objects of the present invention are not limited to the objects as mentioned above and other objects of the present invention, which are not mentioned herein, may be understood by reading the following description and may be more clearly understood by embodiments of the present invention. Furthermore, the objects of the present invention may be realized by the means represented in the appended claims and combinations thereof.

A lightweight cowl crossbar for accomplishing the objects as mentioned above may include the following features:

In one aspect of the present invention, there is provided a lightweight cowl crossbar including a cowl cross beam of connecting transversely side frames disposed on both sides of a vehicle body; side fastening portions to be joined to both end portions of the cowl cross beam; a support leg positioned at a center portion of the cowl cross beam and configured to be supported to a front vehicle body of a vehicle; and a reinforcing bracket of integrally connecting the support leg and the cowl cross beam wherein the components mentioned above are constructed integrally.

Furthermore, there is provided a lightweight cowl crossbar further including a steering column fastening portion formed at the cowl cross beam to support a steering column.

Furthermore, there is provided a lightweight cowl crossbar wherein the steering column fastening portion joined to the cowl cross beam may further include a supporting portion for reinforcing bending stiffness.

Furthermore, there is provided a lightweight cowl crossbar wherein the steering column fastening portion may further include a stress concentrating portion configured to allow the cowl cross beam between the steering column fastening portion and the outside of the vehicle body to be broken when impact is applied from the outside of the vehicle body.

Furthermore, there is provided a lightweight cowl crossbar wherein portions where the side fastening parts, the support leg, the reinforcing bracket and the steering column fastening portion are connected to the cowl cross beam further include at least one reinforcing connection portion, respectively.

Furthermore, there is provided a lightweight cowl crossbar wherein the reinforcing connection portion is configured as a notch shaped or round shaped rib.

Furthermore, there is provided a lightweight cowl crossbar further including a plate-shaped reinforcement member mounted on at least one surface of the cowl cross beam.

Furthermore, there is provided a lightweight cowl crossbar further including a head up display (HUD) mounting portion configured to mount a HUD to the cowl cross beam.

Furthermore, there is provided a lightweight cowl crossbar wherein the HUD mounting portion may further include a bending inducing portion for absorbing impact when the impact is applied from the outside of the vehicle body.

Furthermore, there is provided a lightweight cowl crossbar composed of a combination of polyamide, polyamide 6 (PA6) and long glass fibers (LGFs).

According to an exemplary embodiment of the present invention, the following effects may be achieved by combination and use relationship of the foregoing embodiments and configurations described below.

Various aspects of the present invention provide a cowl crossbar made of a plastic material and thus has an effect of providing a lightweight cowl crossbar.

Furthermore, the present invention has an effect of providing a lightweight cowl crossbar including a plurality of reinforcement members and supporting members to increase stiffness of the cowl crossbar made of the plastic material and thus having sufficient stiffness performance.

Other aspects and exemplary embodiments of the disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the disclosure are discussed infra.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Furthermore, the term "portion," "beam," or the like as described herein means a unit of performing at least one function or operation and may be implemented by combining hardware, software, or hardware and software.

Furthermore, dividing names of certain components into "left . . . ," "right . . . ," etc. herein is directed to distinguish the components having the same name with respect to the front of the vehicle, and the present invention is not necessarily limited to the order of those ordinal terms in the following description.

Figure 1:
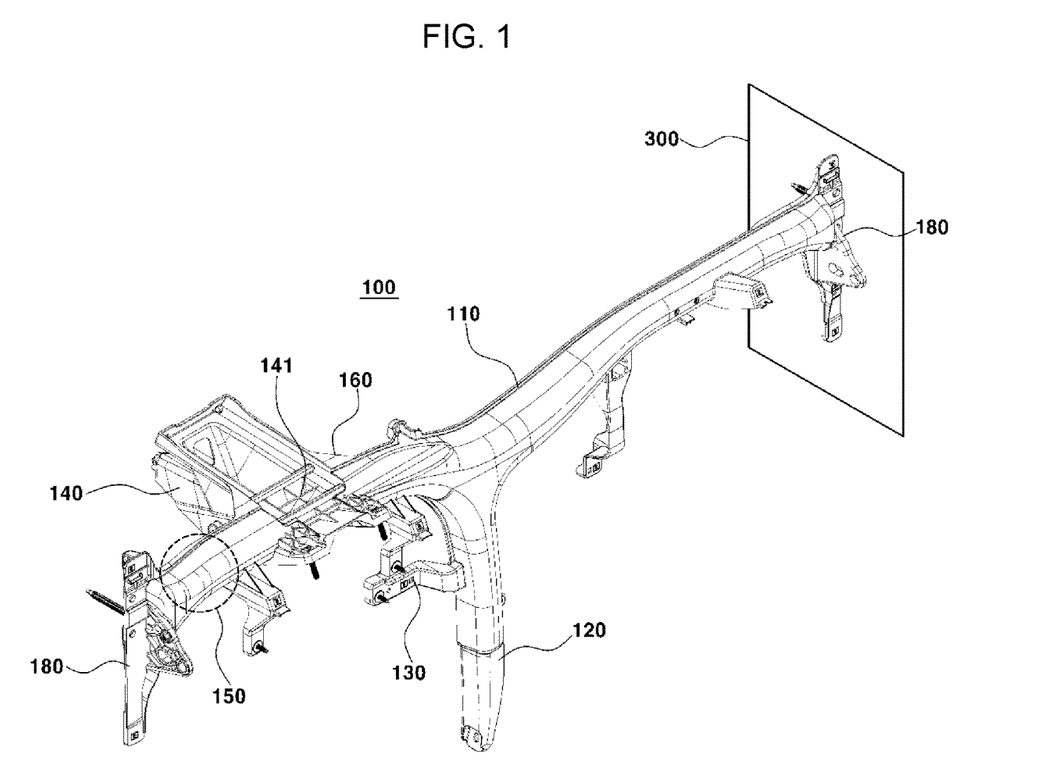
FIG. 1 illustrates a constitution diagram of a lightweight cowl crossbar according to an exemplary embodiment of the present invention.
Figure 2:
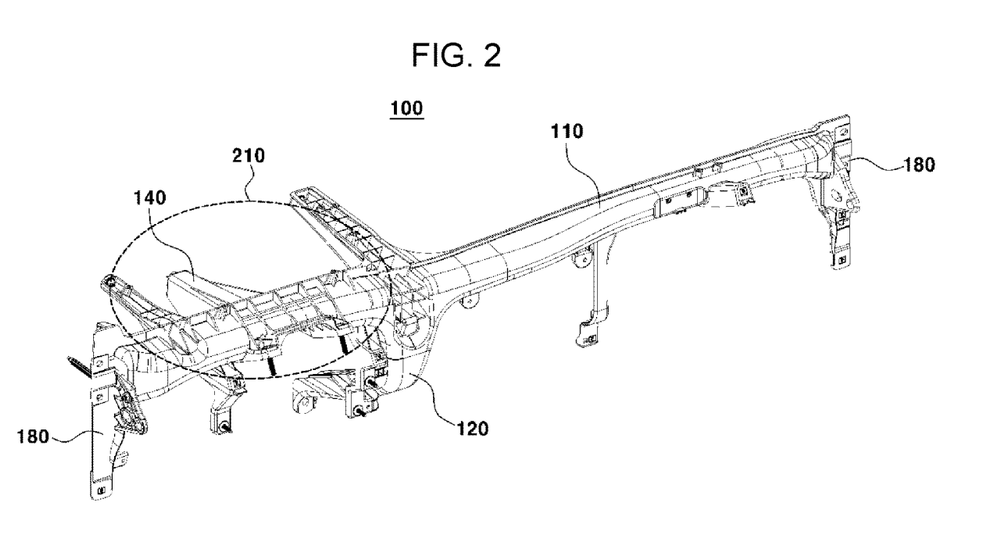
FIG. 2 illustrates a constitution diagram of a lightweight cowl crossbar for a vehicle provided with a HUD, according to various exemplary embodiments of the present invention.

FIG. 1 and FIG. 2 illustrate a lightweight cowl crossbar 100 according to an exemplary embodiment of the present invention wherein the FIG. 1 illustrates configuration of the cowl crossbar 100 that does not include a head up display (HUD) while the FIG. 2 illustrates configuration of the cowl crossbar 100 including a head up display (HUD) or an augmented reality head up display (AR HUD).

The cowl crossbar 100 of the exemplary embodiment of the present invention may include a combination of polyamide, polyamide 6 (PA6) and long glass fibers (LGFs) wherein the cowl crossbar 100 is integrally constructed through a plastic injection molding process for which at least two molds are prepared and shape for releasing molds is considered.

The cowl crossbar 100 of the exemplary embodiment of the present invention may be composed of a material including polyamide as a base material and an additive having physical properties for supplementing moisture resistance and thermal shock resistance.

In an exemplary embodiment of the present invention, the additive may include polyphthalamide (PPA) and long glass fibers wherein the polyphthalamide may be produced by polymerizing isophthalic acid (PA6I) and terephthalic acid (PA6T).

Referring to FIG. 1, the cowl crossbar 100 may include a cowl cross beam 110 traversing both sides of a vehicle body and having both end portions connected to side frames 300 and side fastening portions 180 configured to be joined to the cowl cross beam 110 and the side frames.

The center portion of the cowl cross beam 110 includes a support leg 120 configured to be supported by a front vehicle body of a vehicle. The shape of the support leg 120 may be altered depending on the shape of a cockpit of the vehicle. In an exemplary embodiment of the present invention, the cowl crossbar 100 is designed to be applied to a vehicle using a slim cockpit wherein the support leg 120 positioned at the center portion of the cowl cross beam 110 has a predetermined curvature and to be fixed to the front vehicle body of the vehicle. The shape of the support leg 120 having the predetermined curvature may be configured to the shape of a cockpit to be applied to a vehicle or may be adapted depending on a vehicle including a walk-through space for the driver's and front passenger's seats.

The cowl crossbar 100 according to the exemplary embodiment of the present invention is integrally injection-molded from a plastic material wherein the cowl crossbar further includes a reinforcing bracket 130 for connecting the support leg 120 and the cowl cross beam 110 and the bridge 131 to prevent its supporting stiffness from being lowered due to vibration load applied to the support leg 120.

The reinforcing bracket 130 is configured such that an end portion thereof is connected to a location adjacent to the center portion of the cowl cross beam 110 and its other end portion thereof is connected to at least one end portion of the support leg 120.

The reinforcing bracket 130 may be configured to be fastened to the support leg 120 through joining to a bridge 131.

Referring to FIG. 1, the cowl cross beam 110 is configured such that it is broken and thus satisfies a small overlap performance when collision occurs at the front side of the vehicle. To the present end, the cowl cross beam has a stress concentrating portion 150 such that the portion of the cowl cross beam 110 between the steering column and the side of the vehicle adjacent to the steering column may be broken when collision occurs at the front side of the vehicle. In other words, in the exemplary embodiment of the present invention, it is contemplated that the cowl crossbar 100 made of a plastic material satisfies the small overlap performance.

The stress concentrating portion 150 is formed to allow the cowl cross beam 110 to be broken wherein it is meant by a portion configured to apply a predetermined stress between the steering column and the vehicle body positioned adjacent to the steering column.

As described above, the stress concentrating portion 150 is configured to be positioned at a position where it is directed to allow fracture of the cowl cross beam 110 to occur wherein the position may be provided in one end portion or two or more positions of the cowl cross beam 110 and may be provided in a tip end portion or a partial section.

FIG. 2 includes substantially the same configuration as that in FIG. 1. However, the present figure illustrates another exemplary embodiment of the present invention, which is configured to allow a head up display (HUD) to be mounted to the cowl crossbar 100.

The cowl crossbar 100 mounting the head up display (HUD) of the exemplary embodiment of the present invention includes a cowl cross beam 110 traversing both sides of a vehicle body and having both end portions connected to side frames 300 and side fastening portions 180 configured to be joined to the cowl cross beam 110 and the side frames.

The center portion of the cowl cross beam 110 includes a support leg 120 configured to be supported by a front vehicle body of a vehicle. The shape of the support leg 120 may be altered depending on the shape of a cockpit of the vehicle. In an exemplary embodiment of the present invention, the cowl crossbar 100 is designed to be applied to a vehicle using a slim cockpit wherein the support leg 120 positioned at the center portion of the cowl cross beam 110 has a predetermined curvature and to be fixed to the front vehicle body of the vehicle. The shape of the support leg 120 having the predetermined curvature may be configured to the shape of a cockpit to be applied to a vehicle or may be adapted depending on a vehicle including a walk-through space for the driver's and front passenger's seats.

The cowl crossbar 100 according to the exemplary embodiment of the present invention is integrally injection-molded from a plastic material wherein the cowl crossbar further includes a reinforcing bracket 130 for connecting the support leg 120 and the cowl cross beam 110 and the bridge 131 to prevent its supporting stiffness from being lowered due to vibration load applied to the support leg 120.

Furthermore, the present exemplary embodiment of the present invention is different from the configuration included in FIG. 1 in that it further includes a HUD mounting portion 210. The present HUD mounting portion 210 is configured to allow a HUD to be mounted on a top end portion of the steering column fastening portion 140. Furthermore, the HUD mounting portion 210 is configured to include brackets disposed on both sides of the steering column fastening portion 140, i.e., a right bracket 212 disposed on the right side of the steering column fastening portion 140 and a left bracket 211 disposed on the left side of the steering column fastening portion 140.

Furthermore, the HUD mounting portion 210 may include a reinforcing connection portion 160 formed in a notch shaped or round shaped rib at a position facing the steering column fastening portion 140 such that it reinforces stiffness at a position where the HUD mounting portion 210 and the steering column fastening portion 140 surface each other.

The bracket constructed near the outside of the vehicle out of the left and right brackets 211 and 212 forming the HUD mounting portion 210 may include a bending inducing portion 220.

The bending inducing portion 220, which is to be configured such that the amount of displacement of the steering column satisfies the small overlap performance, may be configured such that the number of ribs and the section modulus thereof are minimized so that the bracket is configured for being bent when impact is exerted from the front side portion of the vehicle.

In an exemplary embodiment of the present invention, the bending inducing portion 220 is disposed on the left bracket 211 wherein it is positioned at a position set to have a predetermined angle such that the bending inducing portion is bent in the lower direction of the vehicle when impact is applied to the vehicle. Furthermore, the bending inducing portion 220 is designed such that the number of ribs and the section modulus thereof are minimized.

Such a bending inducing portion 220 is configured to move downward by the impact so that deformation of the steering column may be minimized by the left bracket 211 to be moved downward.

In the case of the bending inducing portion 220 of the present invention, it may be altered depending on a location where the steering column exists. Therefore, the bending inducing portion 220 disposed in the left bracket 211, which is included in an exemplary embodiment of the present invention, is an example for a left handle vehicle.

Figure 3:
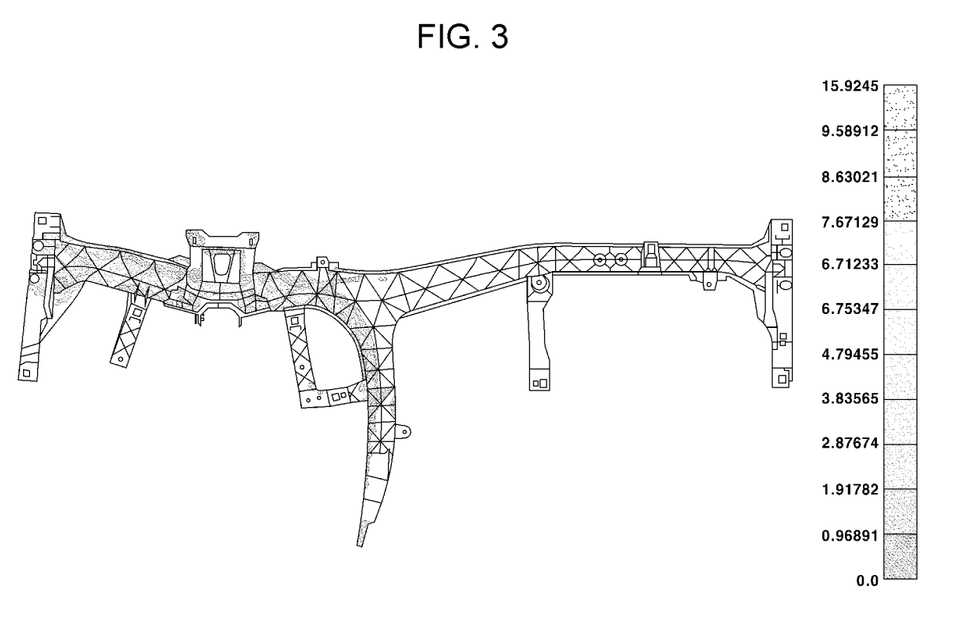
FIG. 3 illustrates an experimental result of strain energy density of a lightweight cowl crossbar according to an exemplary embodiment of the present invention.
Figure 4:
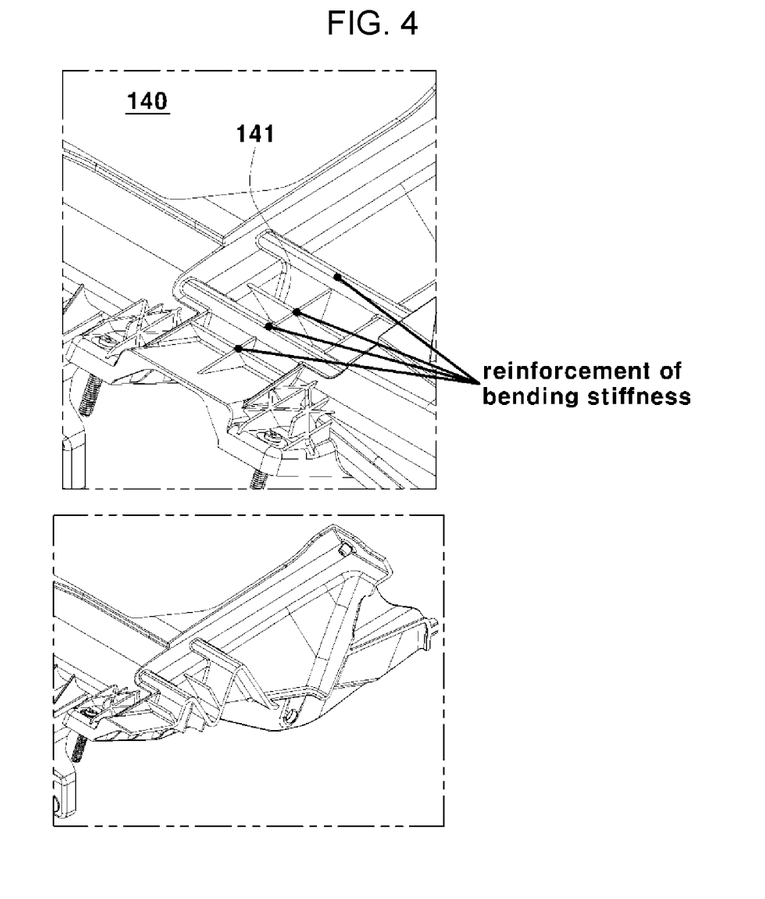
FIG. 4 illustrates a constitution diagram of a supporting portion of a lightweight cowl crossbar according to an exemplary embodiment of the present invention.

FIG. 3 illustrates the position where the strain energy density according to steering vibration is high in an exemplary embodiment of the present invention. FIG. 4 illustrates the configuration of a supporting portion 141 constructed at a position where the strain energy density is high.

The cowl cross beam 110 of the exemplary embodiment of the present invention includes the steering column fastening portion 140 positioned at one side of the vehicle in the lateral direction with respect to the support leg 120 wherein since FIG. 1 shows the configuration for a left handle vehicle, the cowl cross beam includes the steering column fastening portion 140 positioned at the left side of the support leg 120.

The steering column fastening portion 140 is configured to fix the steering column. Furthermore, the steering column fastening portion 140 has a structure configured for bearing vibration load generated from the steering column wherein it includes at least one supporting portion 141 provided at a position where the steering column fastening portion 140 and the cowl cross beam 110 face each other.

The supporting portion 141 may be positioned on the top surface of the position where the steering column fastening portion 140 and the cowl cross beam 110 face each other and include a plurality of ribs forming rectangular lattices.

The supporting portion 141 of the present invention is contemplated to increase a section modulus and may include lattice shaped ribs at the position where the steering column fastening portion 140 and the cowl cross beam 110 face each other. Furthermore, the steering column fastening portion 140 includes a planar shape having a more enlarged section modulus in the longitudinal direction in which the steering column is fastened such that sufficient stiffness against the steering vibration is secured.

In an exemplary embodiment of the present invention, it may include a reinforcement member 170 positioned on at least one surface of the cowl crossbar 100 to secure stiffness of the cowl crossbar 100 including the plastic material.

Figure 5:
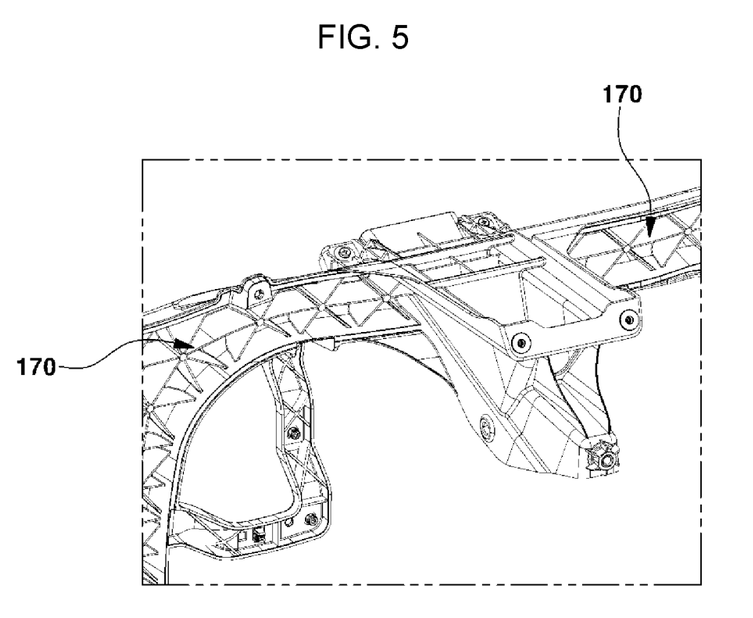
FIG. 5 illustrates an enlarged view of a reinforcement member of a lightweight cowl crossbar according to an exemplary embodiment of the present invention.

The reinforcement member 170 may be constructed in a rib shape (plate shape) having a predetermined angle as shown in FIG. 5 and incorporated in at least one of the cowl cross beam 110, the support leg 120, the reinforcing connection portion 160 and the steering column fastening portion 140, which form the cowl crossbar 100.

In an exemplary embodiment of the present invention, the reinforcement member 170 is constructed as lattice shaped ribs at a position where the steering column fastening portion 140 and the cowl cross beam 110 face each other wherein it may be combined and positioned on the top surface of the cowl cross beam 110 or the face thereof facing the front portion of the vehicle.

The shape of the ribs of the reinforcement member 170 may be configured as a combination of ribs constructed to be orthogonal to each other. The reinforcement member 170 is constructed as a combination of ribs in a form of a lattice and constructed on at least one of the front, rear, top and back surfaces of the vehicle.

In an exemplary embodiment of the present invention, the reinforcement member 170 is configured to be disposed on the front surface of the cowl cross beam 110 and may be constructed as a combination of ribs having a predetermined angle and additional ribs perpendicular to the ribs. Furthermore, the reinforcement member 170 may be disposed at a position where reinforcement of stiffness is required by design and configured to have a high section modulus.

Figure 6:
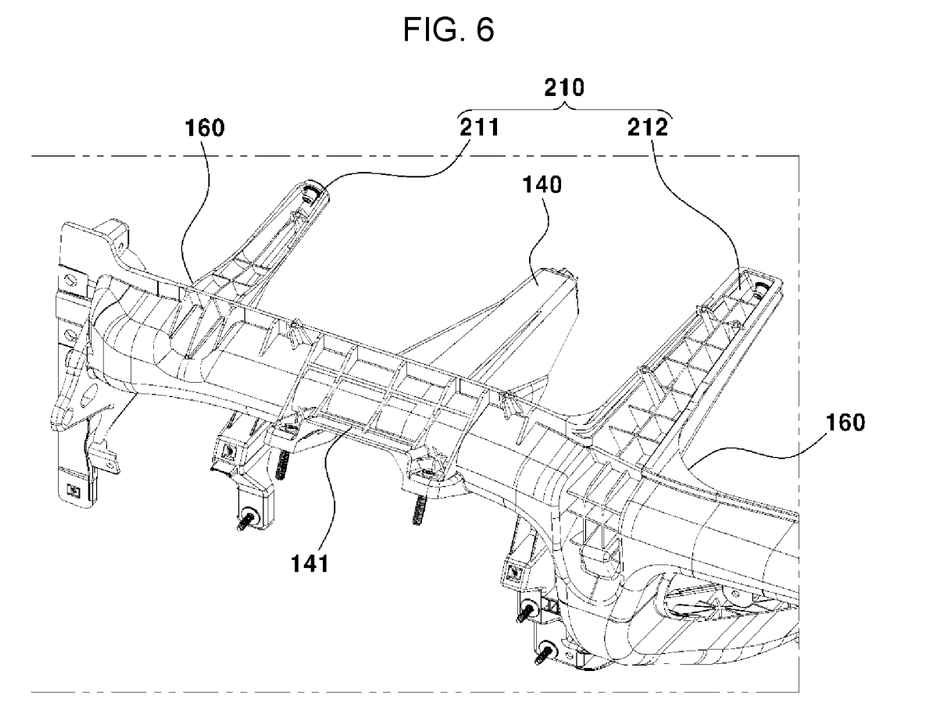
FIG. 6 illustrates a constitution diagram of a reinforcing connection portion of a lightweight cowl crossbar according to an exemplary embodiment of the present invention.

Furthermore, in an exemplary embodiment of the present invention, connection portions for connecting the support leg 120, the reinforcing connection portion 160, the steering column fastening portion 140 and the like to the cowl cross beam 110 may include the configuration of the reinforcing connection portion 160, wherein the reinforcing connection portion 160 may include notch shaped or round shaped rib, as shown in FIG. 6.

As included above, as the cowl crossbar 100 in an exemplary embodiment of the present invention is made of the plastic material, reinforcement of stiffness is necessarily required due to physical properties of the plastic. Therefore, the cowl crossbar may include the reinforcement member 170 and the reinforcing connection portion 160 which are constructed at positions where components are connected to each other and deformation occurs easily.

The supporting stiffness of the cowl crossbar 100 in an exemplary embodiment of the present invention is increased by the reinforcement member 170 and the reinforcing connection portion 160 as described above. Furthermore, the cowl crossbar 100 of the present invention, which may be integrally manufactured through injection molding, makes it possible to easily change the reinforcement member 170 and the reinforcing connection portion 160 and to be manufactured through one injection molding process.

Furthermore, in the case of the configuration for increasing the supporting stiffness of the cowl crossbar 100 of the present invention, such as the reinforcement member 170, the reinforcing connection portion 160 or the supporting portion 141, it may be set in consideration of draft angle for mold release and formed integrally through injection molding.

Figure 7:
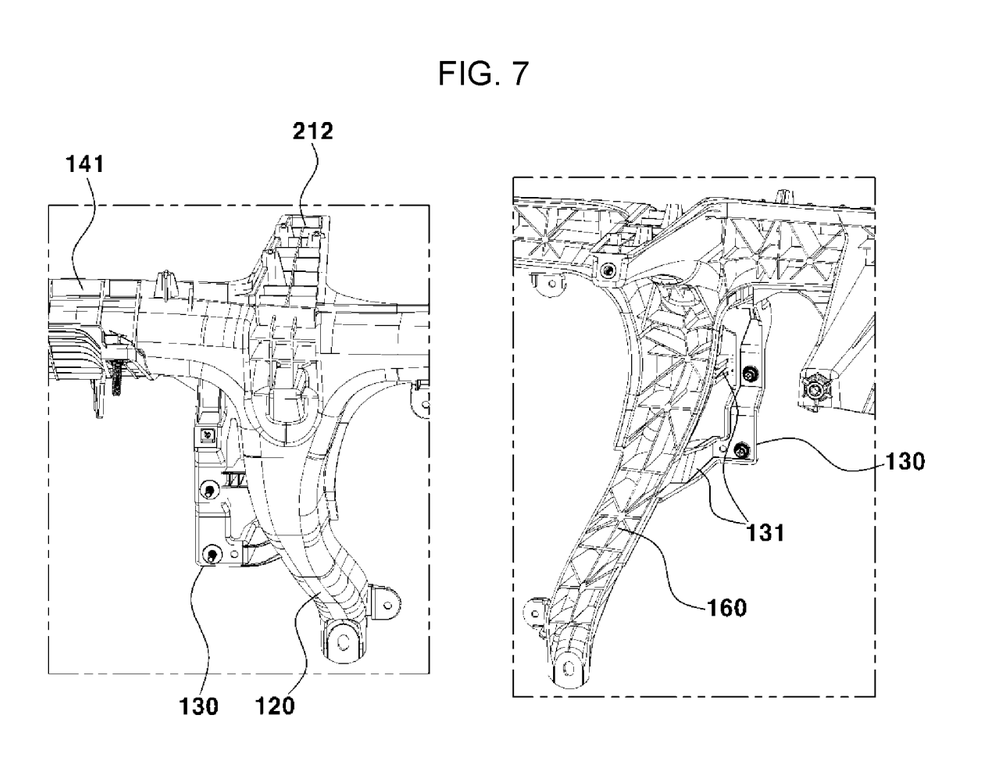
FIG. 7 illustrates a constitution diagram of a reinforcing bracket of a lightweight cowl crossbar according to an exemplary embodiment of the present invention.

FIG. 7 illustrates a joining structure of the reinforcing bracket 130 joined to the support leg 120 according to an exemplary embodiment of the present invention.

As shown in the figure, the support leg 120 is injection-molded integrally with the cowl cross beam 110 and configured to have a predetermined curvature toward the front of the vehicle. As described above, the support leg 120 has a predetermined curvature toward the front of the vehicle to implement a slim cockpit or secure a walk-through space for the driver's and front passenger's seats.

The cowl cross bar may include the reinforcing bracket 130 configured to be bolted to the cowl cross beam 110 adjacent to the support leg 120.

The reinforcing bracket is contemplated to maintain and reinforce the stiffness of the support leg 120 configured to have the predetermined curvature. The present reinforcing bracket is configured such that its one end portion is fastened to the cowl cross beam 110 and its other end portion is fastened to at least one portion of the support leg 120. The reinforcing bracket 130 joined to the support leg 120 may be configured to secure the supporting stiffness through connection to the bridge 131.

Furthermore, the reinforcing bracket 130 may be injection-molded integrally with the cowl crossbar 100 and may be formed as a single molded product using a plurality of molds.

In the present way, stiffness of the support leg 120 of the cowl crossbar 100 integrally injection-molded from a plastic material is increased by the configuration of the reinforcing bracket 130.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lightweight cowl crossbar comprising:
a cowl cross beam configured of connecting transversely side frames disposed on a first side and a second side of a vehicle body;
side fastening portions integrally formed at a first portion of the cowl cross beam and configured to be coupled to the vehicle body;
a support leg integrally formed at a second portion of the cowl cross beam and configured to be supported to a front vehicle body of a vehicle;
a reinforcing bracket of integrally connecting the support leg and the cowl cross beam; and
a steering column fastening portion formed at a third portion of the cowl cross beam to support a steering column,
wherein the steering column fastening portion further includes a stress concentrating portion configured to allow the cowl cross beam between the steering column fastening portion and an outside of the vehicle body to be broken when impact is applied thereto from the outside of the vehicle body.

2. The lightweight cowl crossbar of claim 1,
wherein the steering column fastening portion coupled to the cowl cross beam further includes a supporting portion for reinforcing bending stiffness thereof.

3. The lightweight cowl crossbar of claim 2, wherein the supporting portion is provided at a location where the steering column fastening portion and the cowl cross beam face each other.

4. The lightweight cowl crossbar of claim 1,
wherein portions where the side fastening portions, the support leg, the reinforcing bracket and the steering column fastening portion are connected to the cowl cross beam further include at least a reinforcing connection portion, respectively.

5. The lightweight cowl crossbar of claim 4,
wherein the at least a reinforcing connection portion includes at least a rib.

6. The lightweight cowl crossbar of claim 1, further including:
a reinforcement member mounted on at least a surface of the cowl cross beam.

7. The lightweight cowl crossbar of claim 6, wherein the HUD mounting portion further includes:
a bending inducing portion for absorbing the impact when the impact is applied from the outside of the vehicle body.

8. The lightweight cowl crossbar of claim 1, further including:
a head up display (HUD) mounting portion configured to mount a HUD to the cowl cross beam.

9. The lightweight cowl crossbar of claim 1, wherein the lightweight cowl crossbar is composed of a combination of polyamide, polyamide 6 (PA6) and long glass fibers (LGFs).

* * * * *